US010232747B2

(12) United States Patent
Line et al.

(10) Patent No.: US 10,232,747 B2
(45) Date of Patent: Mar. 19, 2019

(54) MOBILE OFFICE SEATBACK MODULE

(71) Applicant: Ford Global Technologies, LLC, Dearborn, MI (US)

(72) Inventors: Johnathan Andrew Line, Northville, MI (US); Marcos Silva Kondrad, Macomb, MI (US); Kevin Wayne Preuss, Berkley, MI (US); Keith Allen Godin, Dearborn, MI (US); David Frederick Lyons, New Haven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 15/259,210

(22) Filed: Sep. 8, 2016

(65) Prior Publication Data
US 2018/0065513 A1 Mar. 8, 2018

(51) Int. Cl.
*B60N 2/20* (2006.01)
*B60N 2/32* (2006.01)
*B60N 3/00* (2006.01)
B60R 11/00 (2006.01)
H02J 7/00 (2006.01)
H02J 7/02 (2016.01)

(52) U.S. Cl.
CPC ............... *B60N 2/32* (2013.01); *B60N 2/206* (2013.01); *B60N 3/004* (2013.01); *B60R 2011/0015* (2013.01); *H02J 7/0044* (2013.01); *H02J 7/025* (2013.01)

(58) Field of Classification Search
CPC .......... B60N 2/206; B60N 2/32; B60N 3/002; B60N 3/004; B60R 2011/0015; B64D 11/0638

USPC .................... 297/146, 188.04, 188.07, 378.1
See application file for complete search history.

(56) References Cited

U.S. PATENT DOCUMENTS

| | | | |
|---|---|---|---|
| 2,797,739 A | 7/1957 | Orsini |
| 3,451,261 A | 3/1969 | Olsen |
| 4,809,897 A | 3/1989 | Wright, Jr. |
| 4,955,571 A | 9/1990 | Lorence et al. |
| 5,046,433 A | 9/1991 | Kramer |
| 5,092,507 A | 3/1992 | Szablak et al. |
| 5,511,842 A | 4/1996 | Dilon |

(Continued)

FOREIGN PATENT DOCUMENTS

| | | | |
|---|---|---|---|
| CA | 2476655 A1 * | 9/2005 | ............. B60N 2/206 |
| DE | 19901072 | 3/2000 | |

(Continued)

*Primary Examiner* — Ryan D Kwiecinski
(74) *Attorney, Agent, or Firm* — Vichit Chea; Price Heneveld LLP

(57) ABSTRACT

A vehicle seating assembly includes a seat operably coupled with a seatback. The seatback includes an adjustable headrest. A back panel is disposed on a rearward side of the seatback. The back panel includes engagement features removably coupled with a workstation. The workstation includes a plurality of connection features. The connection features includes a mechanical connector, a data connector, and a power connector. An upper support abuts a rear surface of the headrest. An open receptacle is disposed proximate the headrest. An intermediate compartment is disposed adjacent the open receptacle and concealed by first and second opposing doors. A lower compartment is concealed by a bottom door.

20 Claims, 3 Drawing Sheets

(56) References Cited

U.S. PATENT DOCUMENTS

| | | | |
|---|---|---|---|
| 5,732,994 A | 3/1998 | Stancu et al. | |
| 5,845,965 A | 12/1998 | Heath et al. | |
| 5,973,917 A | 10/1999 | White | |
| 6,015,198 A | 1/2000 | Stair | |
| 6,032,587 A | 3/2000 | Salenbauch et al. | |
| 6,059,358 A * | 5/2000 | Demick | B60N 2/206 297/125 |
| 6,123,377 A | 6/2000 | Lecher | |
| 6,090,148 A | 7/2000 | Weber | |
| 6,096,086 A | 8/2000 | Weber | |
| 6,110,216 A | 8/2000 | Weber | |
| 6,135,549 A | 10/2000 | Demick et al. | |
| 6,199,948 B1 * | 3/2001 | Bush | B60N 2/206 297/188.04 |
| 6,220,660 B1 * | 4/2001 | Bedro | B60N 2/79 297/188.04 |
| 6,347,590 B1 | 2/2002 | D'Annunzio et al. | |
| 6,419,314 B1 | 7/2002 | Scheerhorn | |
| 6,547,323 B1 | 4/2003 | Aitken et al. | |
| 6,702,375 B1 * | 3/2004 | Laskowski | B60N 2/206 273/236 |
| 6,719,343 B2 | 4/2004 | Emerling et al. | |
| 6,719,367 B2 | 4/2004 | Mic et al. | |
| 6,746,065 B1 | 6/2004 | Chan | |
| 6,761,388 B2 | 7/2004 | Lein et al. | |
| 6,848,817 B2 | 2/2005 | Bos | |
| 7,080,865 B2 | 7/2006 | Bergeron | |
| 7,114,755 B1 | 10/2006 | Sturt et al. | |
| 7,192,070 B2 | 3/2007 | Radu et al. | |
| 7,278,681 B2 | 10/2007 | Lilov et al. | |
| 7,293,507 B2 | 11/2007 | DePue et al. | |
| 7,296,839 B2 | 11/2007 | Scheerhorn | |
| 7,431,365 B2 | 10/2008 | Sturt et al. | |
| 7,455,016 B2 | 11/2008 | Perin | |
| 7,520,552 B2 | 4/2009 | Nakamura et al. | |
| 7,641,252 B2 | 1/2010 | Sturt et al. | |
| 7,748,762 B2 | 7/2010 | Mayne, Jr. | |
| 7,770,953 B2 | 8/2010 | Korai | |
| 7,793,597 B2 | 9/2010 | Bart et al. | |
| 7,798,072 B2 | 9/2010 | Beckler et al. | |
| 8,002,323 B2 | 8/2011 | Jones et al. | |
| 8,109,565 B2 | 2/2012 | Waters et al. | |
| 8,167,366 B2 | 5/2012 | Charpentier et al. | |
| 8,397,963 B2 | 3/2013 | Singh | |
| 8,421,407 B2 | 4/2013 | Johnson | |
| 8,496,295 B2 | 7/2013 | Chen | |
| 8,845,965 B2 | 9/2014 | Carter et al. | |
| 9,168,850 B2 * | 10/2015 | Meszaros | B60N 2/305 |
| 9,290,112 B2 * | 3/2016 | Rouxel | B60N 3/001 |
| 2006/0100764 A1 | 5/2006 | Adams et al. | |
| 2006/0208517 A1 | 9/2006 | Nakamura et al. | |
| 2007/0126273 A1 * | 6/2007 | Jasinski, II | B60N 2/206 297/378.1 |
| 2007/0182230 A1 * | 8/2007 | Bhatia | B60N 2/206 297/378.1 |
| 2007/0205622 A1 | 9/2007 | Whitens et al. | |
| 2009/0174206 A1 | 7/2009 | Vander Sluis et al. | |
| 2010/0207414 A1 | 8/2010 | Tsuda et al. | |
| 2010/0244478 A1 | 9/2010 | DePue | |
| 2017/0295951 A1 * | 10/2017 | Aguilar Ruelas | B60N 2/90 |

FOREIGN PATENT DOCUMENTS

| | | | |
|---|---|---|---|
| DE | 102005023602 | 5/2005 | |
| FR | 2 698 594 | 6/1994 | |
| FR | 2 833 220 | 6/2003 | |
| FR | 2911548 A1 * | 7/2008 | B60N 2/206 |
| FR | 2969066 A1 * | 6/2012 | B60N 2/206 |
| FR | 3011783 A1 * | 4/2015 | B60N 3/004 |
| FR | 3008934 B1 * | 1/2017 | B60N 2/6009 |
| WO | 2010144420 | 12/2010 | |
| WO | WO-2016140631 A1 * | 9/2016 | B60N 3/004 |

* cited by examiner

MOBILE OFFICE SEATBACK MODULE

FIELD OF THE DISCLOSURE

The present disclosure generally relates to a seating assembly, and more particularly to a mobile office seatback module for a seating assembly.

BACKGROUND OF THE DISCLOSURE

Seating assemblies typically include a seatback to support a back of an occupant in an upright sitting position and various reclined positions. Similar to other portions of a seating assembly, seatbacks are commonly designed to support an occupant in the upright sitting position upon acceleration, change in direction, and collision of the vehicle. Accordingly, seatbacks are substantially rigid and sizeable in construction.

Traditional vehicle seating has frequently included a seat frame that supports a matrix of springs that support a thick cushion thereon. Newer constructions having climate control features add to the bulk. These constructions are generally very thick and heavy, which result in decreased interior space in a vehicle, as well as loss of fuel efficiency as a result of the added weight of the seating system.

SUMMARY OF THE DISCLOSURE

According to one aspect of the present disclosure, a vehicle seating assembly includes a seat operably coupled with a seatback. The seatback includes an adjustable headrest. A back panel is disposed on a rearward side of the seatback. The back panel includes engagement features removably coupled with a workstation. The workstation includes a plurality of connection features. The connection features includes a mechanical connector, a data connector, and a power connector. An upper support abuts a rear surface of the headrest. An open receptacle is disposed proximate the headrest. An intermediate compartment is disposed adjacent the open receptacle and concealed by first and second opposing doors. A lower compartment is concealed by a bottom door.

According to another aspect of the present disclosure, a vehicle seating assembly includes a seat operably coupled with a seatback and a headrest. A back panel is disposed on a rearward side of the seatback. The back panel is removably coupled with a workstation. A support abuts a rear surface of the headrest. An open receptacle is disposed proximate the headrest. An intermediate compartment is disposed adjacent the open receptacle and is concealed by first and second opposing doors. A lower compartment is concealed by a bottom door.

According to yet another aspect of the present disclosure, a seating assembly includes a seat operably coupled with a seatback and a headrest. A rear back panel is coupled with the seatback and is removably coupled with a workstation. The workstation includes a plurality of connection features. The connection features includes a mechanical connector, a data connector, and a power connector. An open receptacle is disposed proximate the headrest. An intermediate compartment is disposed adjacent the open receptacle and concealed by first and second opposing doors. A lower compartment is concealed by a bottom door.

According to still another aspect of the present disclosure, a seating assembly for a vehicle that includes a workstation removably coupled to a backside of a seatback of the seating assembly. The workstation includes connection features that secure the workstation to the seatback and which also provide data/power connectivity to the seatback, and consequently to the vehicle. The workstation includes a number of compartments that can be concealed by doors. The doors may be locked to secure components within the compartments. The doors may also be opened to provide additional work surface space.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
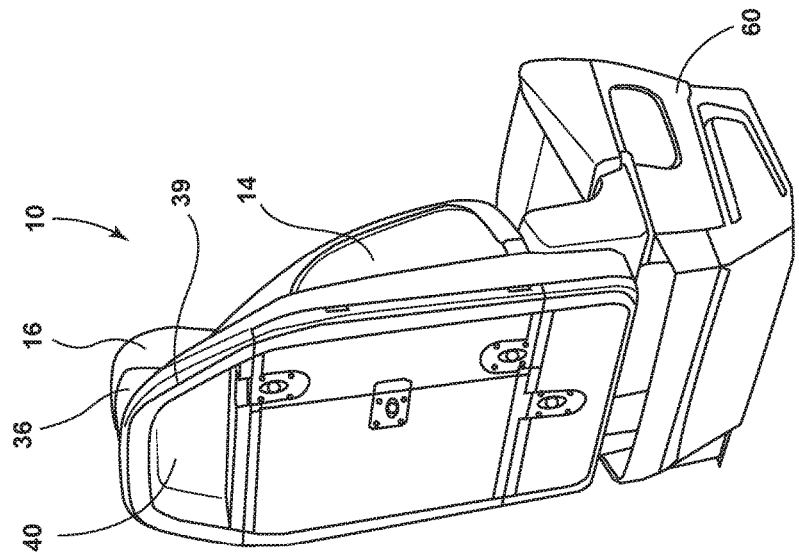
FIG. 1 is a front perspective view of a seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-5, reference numeral 10 generally designates a seating assembly having a seat 12 operably coupled with a seatback 14. The seatback 14 includes an adjustable headrest 16. A back panel 18 is disposed on a rearward side of the seatback 14. The back panel 18 includes engagement features 22 (FIG. 5) removably coupled with a workstation 24.

The workstation 24 includes a plurality of connection features 26. The connection features 26 include a mechanical connector, a data connector, and a power connector. A head restraint portion 34 abuts a rear surface 36 of the headrest 16. An upper wall 39 defines an open receptacle 40 is disposed proximate the headrest 16. An intermediate compartment 42 is disposed adjacent the open receptacle 40 and is concealed by first and second opposing doors 44, 46. The first opposing door 44 is larger than the second opposing door 46. A lower compartment 48 is concealed by a bottom door 50.

With reference again to FIGS. 1 and 2, the seating assembly 10 may be used in any vehicle, such as a car, a truck, a van, etc. It is also contemplated that the concept set forth in this disclosure may be utilized in a front or forward position of the vehicle as well as a rear or rearward position of the vehicle. The seating assembly 10, as illustrated, includes a seat base 60 that is positioned on rail slides to allow fore and aft movement of the seating assembly 10 relative to the vehicle. The seat 12 is operably coupled with the seat base 60 and is movable relative thereto, as set forth in further detail below. In addition, the seatback 14 of the seating assembly 10 includes a lower lumbar region 62 and an upper thoracic region 64 as well as the headrest 16. Each of the components of the seatback 18 may be configured for adjustability to properly support the weight of various occupants inside the vehicle.

Figure 5:
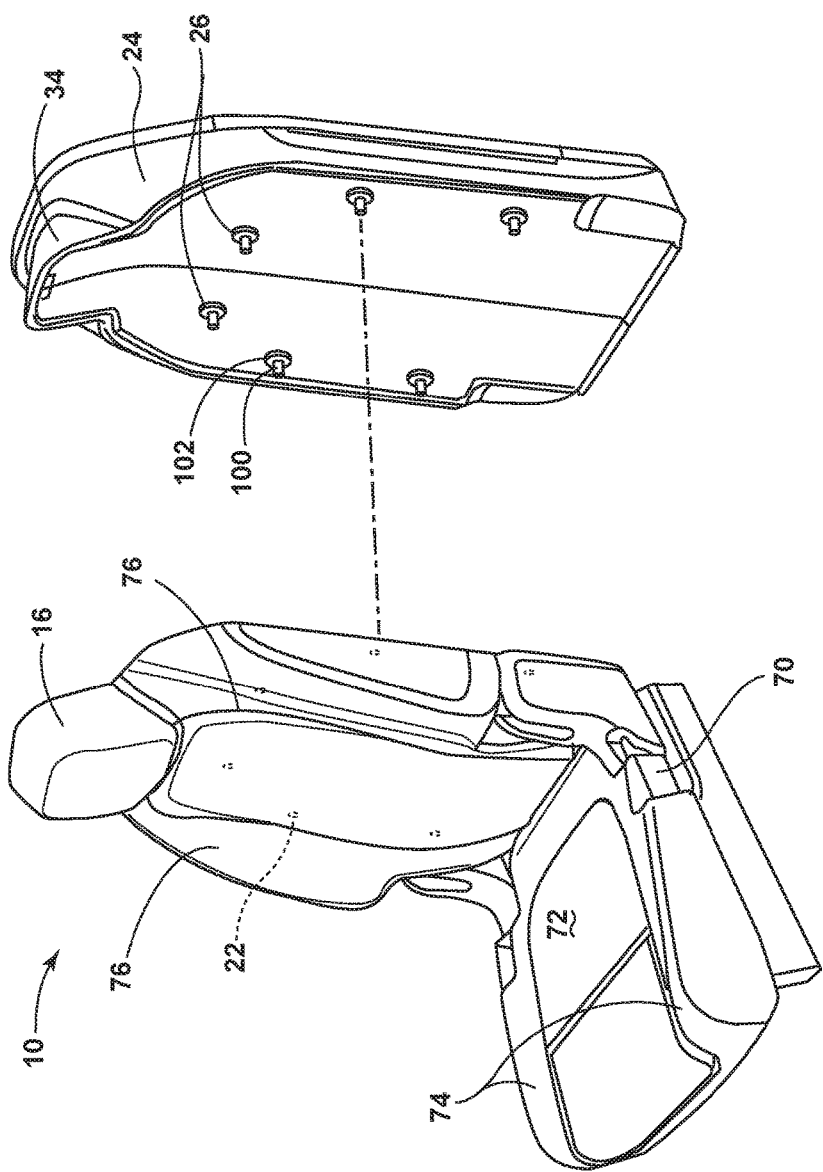
FIG. 5 is a front perspective view of one embodiment of a seating assembly prior to coupling with a workstation.

With reference again to FIG. 1, the illustrated seating assembly 10 may include a variety of controls 70 operable to move the seat 12 relative to a vehicle or relative to the surroundings. The base of the controls 70 may be operably coupled with a motor configured to move the seating assembly 10 on the rail and slide assembly. In addition, the controls 70 may operate electronic and/or mechanical features that adjust various parameters of the seating assembly 10 within the vehicle. Further, it will be noted that the seating assembly 10 includes pivot members that allow for movement of the seatback 14 relative to the seat 12. The seat 12 includes a seat cushion 72 as well as side thigh bolsters 74. The seatback 14 includes seatback side bolsters 76 to provide comfort and security to an occupant. In addition, the seatback 14 includes the headrest 16 configured to provide support to an occupant both during travel and during a rear collision event. The back panel 18 conceals the inner components of the seatback 14 and is configured for engagement with a plurality of connection features 26 extending from the workstation 24. It will be understood that the connection features 26 may include posts as generally illustrated in FIG. 5. However, the connection features may also include a variety of other configurations including receiving apertures, snap fit connections, interference fit connections, etc. Moreover, it will be understood that the connection features 26 may provide for mechanical connection of the workstation 24 to the back panel 18 and at the same time provide a power and/or data connection of the workstation 24 with the back panel 18. As a result, the workstation 24 is coupled with the seatback 14 which is in communication with the vehicle. Accordingly, the workstation 24 and features of the vehicle may be adjusted via an interface that is coupled with the workstation 24.

Figure 2:
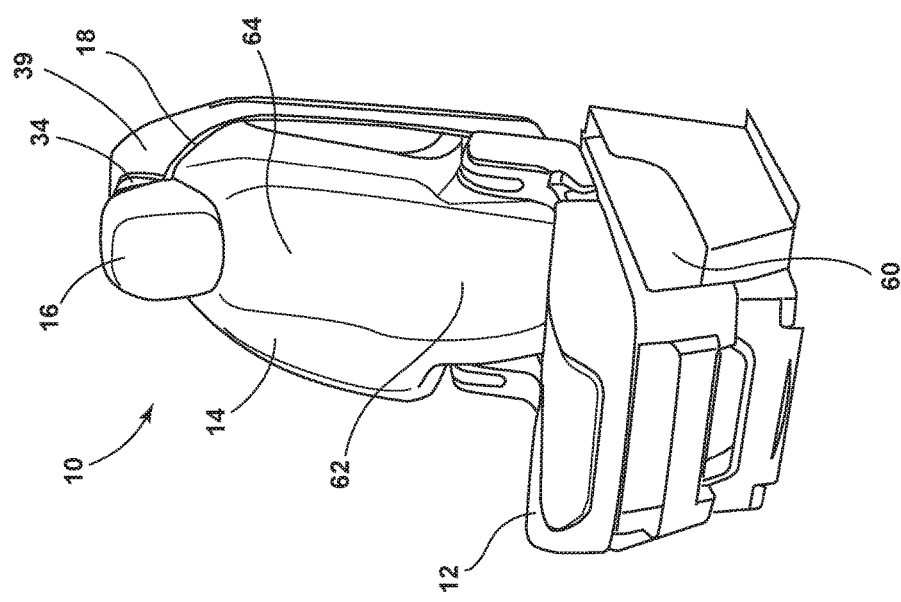
FIG. 2 is a rear perspective view of the seating assembly of FIG. 1.

With reference to FIG. 2, the workstation includes a top portion generally defining the open receptacle 40 proximate the headrest 16. The head restraint portion 34 is disposed on an opposite side of the workstation 24. The intermediate compartment 42 of the workstation is adjacent to the open receptacle 40 and concealed by the first and second opposing doors 44, 46. As illustrated, the first opposing door 44 is larger than the second opposing door 46, although the first and second opposing doors 44, 46 could also be the same size. The bottom door 50 conceals the lower compartment 48. Both the lower compartment 48 and the intermediate compartment 42 include latches 80. The latches 80 may be push release mechanisms, or push/push release mechanisms and may also include lockable features such that the intermediate compartment 42 and the lower compartment 48 and particularly the contents disposed therein may be stowed within the workstation 24 in a secure manner. As illustrated, it is generally understood that the first and second opposing doors 44, 46 pivot open outwardly about a periphery of the workstation 24. Stated differently, the first and second opposing doors 44, 46 open away from a middle portion of the seatback 14, and hinge about sides of the seatback 14. In addition, the bottom door 50 rotates about a hinge disposed at a bottom of the seatback 14.

Figure 3:
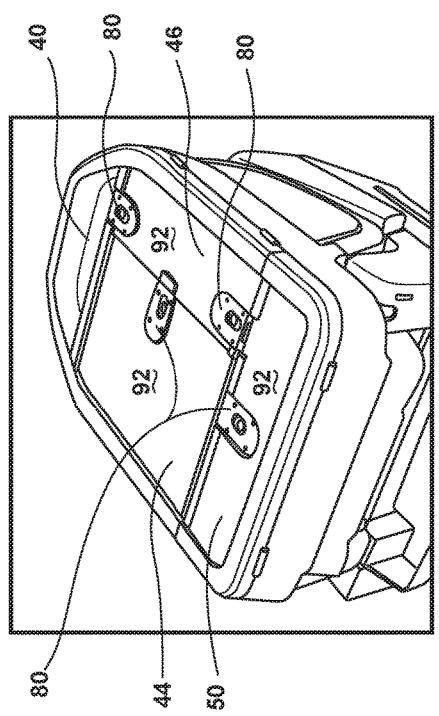
FIG. 3 is a rear perspective view of the seating assembly of FIG. 3, with compartments of a workstation in an open condition.
Figure 4:
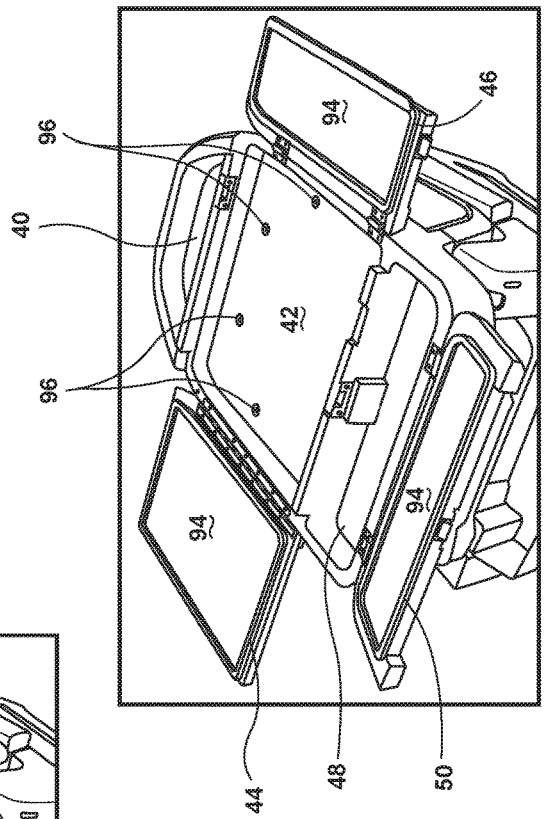
FIG. 4 is a rear perspective view of the seating assembly of FIG. 3, with compartments of a workstation in an open condition.

With reference now to FIG. 3, the workstation 24 is configured to be lowered to a lateral horizontal position wherein an outer surface 92 of the first and second opposing doors 44, 46 as well as the bottom door 50 can be used as a work surface. The first and second opposing doors 44, 46 are configured to open and then stop at a position generally horizontal such that an inside surface 94 of the first and second opposing doors 44, 46 can serve as a useful work surface. The workstation 24 can also be opened, as shown in FIG. 4, to allow access to the intermediate compartment 42 and the lower compartment 48. In this instance, data and/or electrical connectivity is provided through the workstation 24 to allow for components such as phones, tablets, etc. to be charged through the workstation 24. It is generally contemplated that outlets 96 may be provided within the intermediate compartment 42 and lower compartment 48. The outlets 96 may provide data and/or power connectivity. However, it is also contemplated that inductive charging may also be used in that inductive chargers, or pads, may be positioned on an inner wall of the intermediate compartment 42 or lower compartment 48. Alternatively, inductive charging may be available on the inside surface 94 of the first and second opposing doors 44, 46 or the bottom door 50. In addition, the inside surface 94 of the first and second opposing doors 44, 46 as well as the inside surface 94 of the bottom door 50 may include high friction materials configured to minimize slippage when items are placed on the inside surface 94 of the first and second opposing doors 44, 46, or the bottom door 50.

With reference now to FIG. 5, in the illustrated embodiment, the connection features 26 are configured to engage and secure the workstation 24 to the back panel 18 of the seating assembly 10. The connecting features 26 are illustrated as connecting posts 100 that include pliable washers 102 extending around the connecting posts 100 to provide for a close fit of the workstation 24 to the back panel 18 that minimizes shock and vibration as the vehicle travels. It is generally contemplated that each of the connection features 26 may include a power and/or data plug that supplies power and/or data within the intermediate compartment 42 or lower compartment 48. Notably, the workstation 24 receives additional support from the head restraint portion 34 that extends behind the headrest 16. In addition, the head restraint portion 34 may provide additional storage within the open receptacle 40.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
   a seat operably coupled with a seatback, the seatback including an adjustable headrest; and
   a back panel disposed on a rearward side of the seatback, the back panel including engagement features removably coupled with a workstation, the workstation comprising:
   a plurality of connection features, the connection features including a mechanical connector, a data connector, and a power connector;
   an upper support abutting a rear surface of the headrest;
   an open receptacle proximate the headrest;
   an intermediate compartment adjacent the open receptacle and concealed by first and second opposing doors; and
   a lower compartment concealed by a bottom door.

2. The vehicle seating assembly of claim 1, wherein one of the first and second opposing doors defines a work surface that opens to a substantially lateral horizontal position.

3. The vehicle seating assembly of claim 1, further comprising:
   a power plug disposed in at least one of the intermediate compartment and the lower compartment.

4. The vehicle seating assembly of claim 1, further comprising:
   a data plug disposed in at least one of the intermediate compartment and the lower compartment.

5. The vehicle seating assembly of claim 1, wherein the first and second opposing doors and the bottom door are pivotal about hinges disposed about a periphery of the workstation.

6. The vehicle seating assembly of claim 1, further comprising:
   an inductive charging pad disposed in at least one of the open receptacle, the intermediate compartment, and the lower compartment.

7. The vehicle seating assembly of claim 1, wherein the first opposing door is larger than the second opposing door.

8. The vehicle seating assembly of claim 1, wherein at least two of the mechanical connector, the data connector, and the power connector define a single connection feature.

9. A vehicle seating assembly comprising:
   a seat operably coupled with a seatback and a headrest; and
   a back panel disposed on a rearward side of the seatback and removably coupled with a workstation, the workstation comprising:
   a support abutting a rear surface of the headrest;
   an open receptacle proximate the headrest;
   an intermediate compartment adjacent the open receptacle and concealed by first and second opposing doors; and
   a lower compartment concealed by a bottom door.

10. The vehicle seating assembly of claim 9, wherein one of the first and second opposing doors defines a work surface that opens to a substantially lateral horizontal position.

11. The vehicle seating assembly of claim 9, further comprising:
    a power plug disposed in at least one of the intermediate compartment and the lower compartment.

12. The vehicle seating assembly of claim 9, further comprising:
    a data plug disposed in at least one of the intermediate compartment and the lower compartment.

13. The vehicle seating assembly of claim 9, wherein the first and second opposing doors and the bottom door are pivotal about hinges disposed about a periphery of the workstation.

14. The vehicle seating assembly of claim 9, further comprising:
    an inductive charging pad disposed in at least one of the open receptacle, the intermediate compartment, and the lower compartment.

15. The vehicle seating assembly of claim 9, wherein the first opposing door is larger than the second opposing door.

16. The vehicle seating assembly of claim 9, further comprising:
    a mechanical connector, a data connector, and a power connector.

17. A seating assembly comprising:
a seat operably coupled with a seatback and a headrest; and
a rear back panel coupled with the seatback and removably coupled with a workstation comprising:
   a plurality of connection features including a mechanical connector, a data connector, and a power connector, the connection features coupling the workstation to the rear back panel;
   an upper wall defining an open receptacle proximate the headrest, wherein a head restraint portion is disposed between and coupled with the headrest and the upper wall;
   an intermediate compartment adjacent the open receptacle and concealed by opposing doors;
   a lower compartment concealed by a bottom door.

18. The vehicle seating assembly of claim 17, wherein the opposing doors and the bottom door are pivotal about hinges disposed about a periphery of the workstation.

19. The vehicle seating assembly of claim 17, further comprising:
an inductive charging pad disposed in at least one of the open receptacle, the intermediate compartment, and the lower compartment.

20. The vehicle seating assembly of claim 17, wherein the opposing doors include first and second opposing doors and wherein the first opposing door is larger than the second opposing door.

\* \* \* \* \*